United States Patent
Napoli et al.

(10) Patent No.: US 8,042,094 B2
(45) Date of Patent: Oct. 18, 2011

(54) ARCHITECTURE FOR RENDERING GRAPHICS ON OUTPUT DEVICES

(75) Inventors: Joshua Napoli, Arlington, MA (US); Won-Suk Chun, Cambridge, MA (US); Thomas J. Purtell, II, Cambridge, MA (US); Gregg E. Favalora, Arlington, MA (US)

(73) Assignee: Ellis Amalgamated LLC, Arlington, MA (US)

( * ) Notice: Subject to any disclaimer, the term of this patent is extended or adjusted under 35 U.S.C. 154(b) by 716 days.

(21) Appl. No.: 11/176,057

(22) Filed: Jul. 7, 2005

(65) Prior Publication Data

US 2006/0010454 A1  Jan. 12, 2006

Related U.S. Application Data (60) Provisional application No. 60/586,327, filed on Jul. 8, 2004.

(51) Int. Cl.
*G06F 9/44* (2006.01)

(52) U.S. Cl. ......... 717/109; 717/108; 717/113; 717/116

(58) Field of Classification Search .......... None
See application file for complete search history.

(56) References Cited

U.S. PATENT DOCUMENTS

| | | | |
|---|---|---|---|
| 3,140,415 A | 7/1964 | Ketchpel | 313/146 |
| 4,574,364 A | 3/1986 | Tabata et al. | 364/900 |
| 5,132,839 A | 7/1992 | Travis | 359/462 |
| 5,227,771 A | 7/1993 | Kerr et al. | 340/731 |
| 5,745,666 A | 4/1998 | Gilley et al. | 395/128 |
| 6,181,338 B1 | 1/2001 | Brodhun | 345/342 |
| 6,377,229 B1 * | 4/2002 | Sullivan | 345/6 |
| 6,501,487 B1 | 12/2002 | Taguchi | 345/788 |
| 6,529,201 B1 * | 3/2003 | Ault et al. | 345/582 |
| 6,554,430 B2 | 4/2003 | Dorval et al. | 353/7 |
| 6,747,642 B1 * | 6/2004 | Yasumoto | 345/419 |
| 2002/0105518 A1 | 8/2002 | Napoli | 345/424 |
| 2002/0113752 A1 | 8/2002 | Sullivan et al. | |
| 2002/0154214 A1 * | 10/2002 | Scallie et al. | 348/51 |

FOREIGN PATENT DOCUMENTS

| | | |
|---|---|---|
| DE | 2622802 | 11/1983 |
| WO | WO 00/00934 A | 1/2000 |
| WO | WO 2004/049262 A1 | 6/2004 |

OTHER PUBLICATIONS

Blundell et al., "Outline of a Low-Cost Prototype System to Display Three-Dimensional Images," IEEE Transactions on Instrumentation and Measurement, Aug. 1991, vol. 40, No. 4, pp. 792-793.

(Continued)

*Primary Examiner* — Chuck Kendall
(74) *Attorney, Agent, or Firm* — Cantor Colburn LLP (57) ABSTRACT

A method for accessing graphical information including receiving one or more graphics commands written in an application programming interface (API). The graphics commands are converted into a graphical language that facilitates the execution of the commands for a plurality of output devices of one or more types.

44 Claims, 6 Drawing Sheets

OTHER PUBLICATIONS

O. S. Cossairt, "A View-Sequential 3D Display," Massachusetts Institute of Technology, Sep. 2003, pp. 1-66.

Kollin et al., "Real-Time Display of 3-D Computed Holograms by Scanning the Image of An Acousto-Optic Modulator," SPIE vol. 1136 Holographic Optics II: Principles and Applications (1989), pp. 178-185.

Wikipedia, The Free Encyclopedia[Online], "Open Inventor," Jun. 24, 2004, retrieved from Inernet URL http://en.wikipedia.org/w/index.php?title=Open_Inventor&oldid=5801073>.

Lim J et al, "A multiview sequence CODEC with view scalability," Signal Processing: Image Communication, Elseview Science Publishers, AMsterdam, NL, vol. 19, No. 3, Mar. 2004, pp. 239-256.

Favalora G et al, "Volumetric Three-Dimensional Display System with Rasterization Hardware," Proceedings of the Spie, SPIE, Bellingham, VA, US, vol. 4297, Jan. 22, 2001, pp. 227-235.

International Search Report for International Application No. PCT/US2005/024392, date mailed Mar. 28, 2006.

Written Opinion of the International Searching Authority for Application No. PCT/US2005/024392.

* cited by examiner

PipelineSystem structure

ARCHITECTURE FOR RENDERING GRAPHICS ON OUTPUT DEVICES

CROSS REFERENCE TO RELATED APPLICATIONS

This application claims the benefit of the filing date of U.S. provisional patent application Ser. No. 60/586,327, filed Jul. 8, 2004, the contents of which are herein incorporated by reference.

GOVERNMENT RIGHTS

The U.S. Government may have certain rights in this invention pursuant to Grant No. 70NANB3H3028 awarded by the National Institute of Standards and Technology (NIST).

BACKGROUND

The present disclosure relates generally to imaging and visualization, and, more particularly, to a generalized application programming interface (API) for rendering graphics on a variety of output devices. Example output device types include, but are not limited to: two-dimensional displays; three-dimensional displays such as volumetric, multi-view, and holographic displays; and two- and three-dimensional printers.

Modern graphics environments must solve the problem that the application software generally runs on separate hardware from the rendering algorithms. Since off-the-shelf personal computers (PCs) are not yet specialized for spatial three-dimensional (3-D) rendering, the process separation is generally more complicated than sending the data across the peripheral component interface (PCI)-express bus. The Chromium architecture is a prior attempt to solve this problem. Chromium abstracts a graphical execution environment. However, the binding between an application, rendering resources and display is statically determined by a configuration file. Therefore, applications cannot address specific rendering resources.

To ensure applicability to a broad range of users, the software environment for the display should cater to at least three classes of software applications. Consider, for example, the case in which the output device is a volumetric 3-D display such as the Perspecta® Spatial 3-D Display (Actuality Systems, Inc., Bedford, Mass.) described in U.S. Pat. No. 6,554,430. The first class of software applications includes legacy applications that were written without foreseeing integration with a volumetric display. It is helpful to be able to use legacy applications because a large number of them exist which perform useful and challenging visualization work. A second class of software applications includes ported applications that have had some minor adjustment by an application vendor to accommodate a volumetric display. Since volumetric displays are not already in widespread use, application vendors may take a risk when they modify their software for these displays. To get the broadest range of applications, it is important to minimize the risk to application vendors by providing easy-to-use extensions to existing graphics APIs. A third class of software applications includes native applications that are written to take full advantage of the capabilities of volumetric displays.

Continuing this example, the software environment for a volumetric display must provide the ability to efficiently handle large datasets and be flexible enough to apply a broad range of rendering effects. Previous low-level graphics APIs were not designed with 3-D displays in mind. They do not provide the abstractions needed to efficiently target the variety of two-dimensional (2-D) and 3-D displays that are now becoming available. The benefit to the visionary application vendors that adapt to new display technologies should be maximized by providing a consistent abstraction to a variety of emerging display types.

A well-known graphics API is the Open Graphics Language (OpenGL) API. In some cases it is possible to adapt an OpenGL driver (e.g., the OpenGL Driver from Actuality Systems, Incorporated) with little effort, to yield interoperability with a legacy software application. Many off-the-shelf applications are fully functional and no additional work is required. However, sometimes it is not possible to adapt all of the functions of a complex application or one that uses specialized rendering techniques. Customers are now looking for a higher level of integration with these sophisticated applications. OpenGL does not sufficiently abstract the process of rendering to suit volumetric displays to support this higher level of integration.

One problem with the OpenGL API is that it includes assumptions that are only appropriate for a flat, 2-D monitor. For example, the depth of the model within the rendering window is not defined. A second problem with OpenGL is that it does not abstract a large enough range of rendering operations. Volume rendering is an important function in many professional applications, and it may grow in importance in recreational applications. The parameters to control a volume rendering operation are similar for all display types, and there are flexible techniques for implementing the operations on existing graphics hardware. It would be desirable for a display-agnostic interface to abstract volume rendering.

Furthermore, volumetric displays cannot be completely served by existing graphical user interface (GUI) infrastructures. Actuality Systems, Incorporated has defined a volume manager to organize the new functions required by volumetric applications. One of the first features of this volume manager is to provide an application-independent 3-D pointer. See, for example, U.S. patent application Ser. No. 10/941,452 to Napoli et al., of common assignment herewith and U.S. Patent Application No. 2004/0135974 A1 to Favalora et al., also of common assignment herewith.

In summary, current software architectures for 3-D display systems suffer from at least the following limitations. Applications cannot address remote or distributed resources. Such resources are necessary for displays where ready-made rendering hardware is not available for PCs. Also, applications can only address assets that are stored in a few prescribed formats. Imaging application software cannot access datasets with specialized encodings unless the application software includes a reformatting step. Reformatting reduces the ultimate performance of the application. A further limitation is that legacy, ported, and native application classes are not handled in a uniform way. Existing 3-D graphics APIs are designed with assumptions that are only valid for flat, 2-D monitors. For example, the appearance of a scene is only defined from a single given viewpoint. Another limitation is that existing 3-D graphics APIs do not completely abstract rendering algorithms. For example, a volume rendering operation cannot be specified. A further limitation is that existing software architectures do not provide support for 3-D user interfaces.

BRIEF DESCRIPTION OF THE DRAWINGS

Referring now to the figures, which are exemplary embodiments and wherein like elements are numbered alike.

SUMMARY OF THE INVENTION

Exemplary embodiments of the present invention are directed to a method for accessing graphical information. The method includes receiving one or more graphics commands written in an application programming interface (API). The graphics commands are converted into a graphical language that facilitates the execution of the commands for a plurality of output devices of one or more types.

Other exemplary embodiments are directed to an architecture for accessing graphical information. The architecture includes an API layer for receiving one or more graphics commands written in an API. The architecture also includes a spatial visualization layer for converting the graphics commands into a graphical language that facilitates the execution of the commands for a plurality of output devices of one or more types.

Further exemplary embodiments are directed to a system for accessing graphical information. The system includes an input device and a processor in communication with the input device. The input device receives graphics commands written in an API. The processor includes instructions for converting the graphics commands into a graphical language that facilitates the execution of the commands for a plurality of output devices of one or more types.

Still further exemplary embodiments are directed to a computer program product for accessing graphical information. The computer program processor includes a storage medium readable by a processing circuit and storing instructions for execution by the processing circuit for performing a method. The method includes receiving one or more graphics commands written in an application programming interface (API). The graphics commands are converted into a graphical language that facilitates the execution of the commands for a plurality of output devices of one or more types.

DETAILED DESCRIPTION

Exemplary embodiments of the present invention include a spatial 3-D architecture with a real-time compatibility layer to allow legacy applications to support a broad range of 3-D display devices through an application and display-agnostic dataflow design. The architecture also has a spatial visualization environment (SVE), that includes a 3-D rendering API and a display virtualization layer that enables application developers to universally exploit the unique benefits (such as true volumetric rendering) of 3-D displays. SVE supports the cooperative execution of multiple software applications. As part of the SVE, a new API is defined, referred to herein as the spatial graphics language (SpatialGL), to provide an optional, display-agnostic interface for 3-D rendering. SpatialGL is a graphical language that facilitates access to remote displays and graphical data (e.g., rendering modules and assets). The architecture further has core rendering software which includes a collection of high-performance rendering algorithms for a variety of 3-D displays. The architecture also includes core rendering electronics including a motherboard that combines a graphics processing unit (GPU) with a 64-bit processor and double-buffered video memory to accelerate 3-D rendering for a variety of high-resolution, color, multiplanar and/or multiview displays. Many of today's 3-D software applications use the well-known OpenGL API. To provide compatibility with those applications, exemplary embodiments of the present invention include an OpenGL driver for the Actuality Systems, Incorporated Perspecta Spatial 3-D Display product. Embodiments of the Perspecta Spatial 3-D Display product are described in U.S. Pat. No. 6,554,430 to Dorval et al., of common assignment herewith.

Currently, a volume manager is available to manage cooperative access to display resources from one or more simultaneous software applications (see for example, U.S. Patent Application No. 2004/0135974 A1 to Favalora et al., of common assignment herewith). Current implementations of the volume manager have asset and rendering resources that are not abstracted separately from the display. The display rendering and storage system are considered as a single concept. Therefore, the display and rendering system must be designed together. Effectively, the display must be designed with the maximum image complexity in mind. Exemplary embodiments of the SVE, as described herein, remove this restriction by providing separately named asset, computation (rendering), and display resources. Unlike other rendering systems, the application has the flexibility to combine these resources by addressing each one independently.

Figure 1:
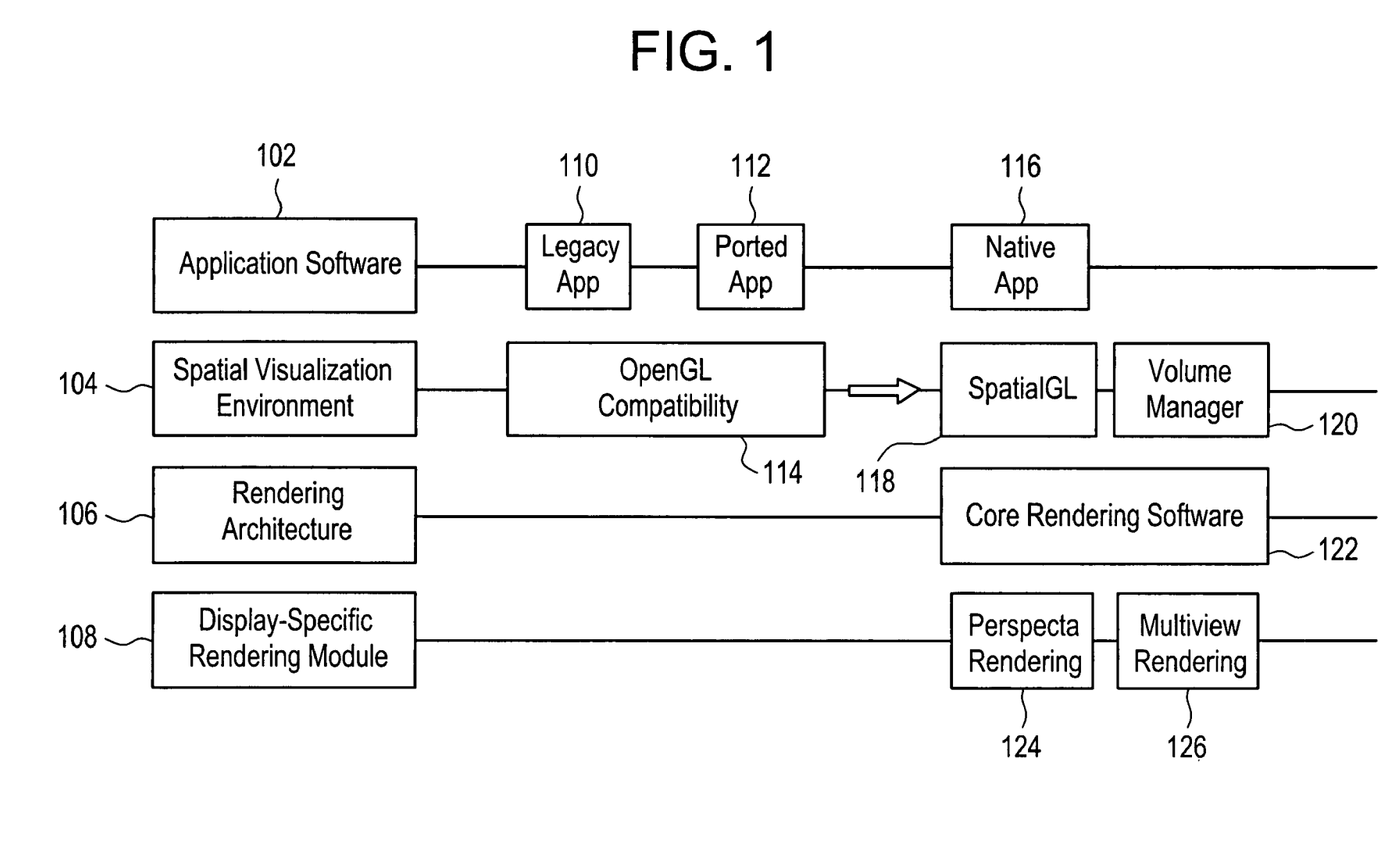
FIG. 1 depicts an overview of an architecture that may be implemented by exemplary embodiments of the present invention.

FIG. 1 depicts an overview of an architecture that may be implemented by exemplary embodiments of the present invention. Cooperative access is provided to display resources by native, ported and legacy application software. Unlike other rendering systems, ported and legacy applications have first class access to display resources. They have access to the volume manger, so that they are not confined to full-screen or standalone modes. Ported applications have access to all named resources that are compatible with the underlying API. A means is also provided for interfacing one or more central applications with a local, remote or distributed rendering or display systems and for interfacing external databases with a rendering system.

The architecture depicted in FIG. 1 includes four layers, an application software layer 102, an SVE layer 104, a rendering architecture layer 106 and a display-specific rendering module layer 108. The application software layer 102 includes legacy applications 110, ported applications 112 and native applications 116. The legacy applications 110 and the ported applications 112 are written to the OpenGL API and converted into the SpatialGL API 118 by the OpenGL compatibility module 114 in the SVE layer 104. OpenGL and SpatialGL are examples of API types. Exemplary embodiments are not limited to these two types of APIs and may be extended to support any graphics APIs such as the Direct3D API. The native applications 116 are written to the SpatialGL API 118 which is in communication with the volume manager 120. The rendering architecture layer 106 depicted in FIG. 1 includes core rendering software (CRS) 122, which is a device independent management layer for performing computations/renderings based on commands received from the SpatialGL API 118 and data in the volume manager 120. The display-specific rendering module layer 108 includes a Perspecta rendering module 124 for converting data from the CRS 122 for output to a Perspecta Spatial 3-D Display and a multiview rendering module 126 for converting data from the CRS 122 into output to other 3-D and 2-D display devices.

Unlike prior architectures, the architecture depicted in FIG. 1 transforms commands (e.g., graphics commands) from several API types into a single graphical language, SpatialGL. This permits the architecture to provide consistent access to display and rendering resources to both legacy and native application software. This is contrasted with the currently utilized device-specific rendering drivers. Each driver manages rendering hardware, visual assets (display lists, textures, vertex buffers, etc.), and display devices. The architecture depicted in FIG. 1 includes a rendering architecture layer 106 that is a device-independent management layer that with core rendering software 122. This rendering architecture layer 106 gives the graphics language (SpatialGL 118) access to diverse, high-level resources, such as multiple display geometries, rendering clusters and image databases. Each class of resources: asset (e.g., volume manager 120); computational (e.g., core rendering software 122); and display (e.g., Perspecta rendering 124 and multiview rendering 126) is enabled by an independent module.

Figure 2:
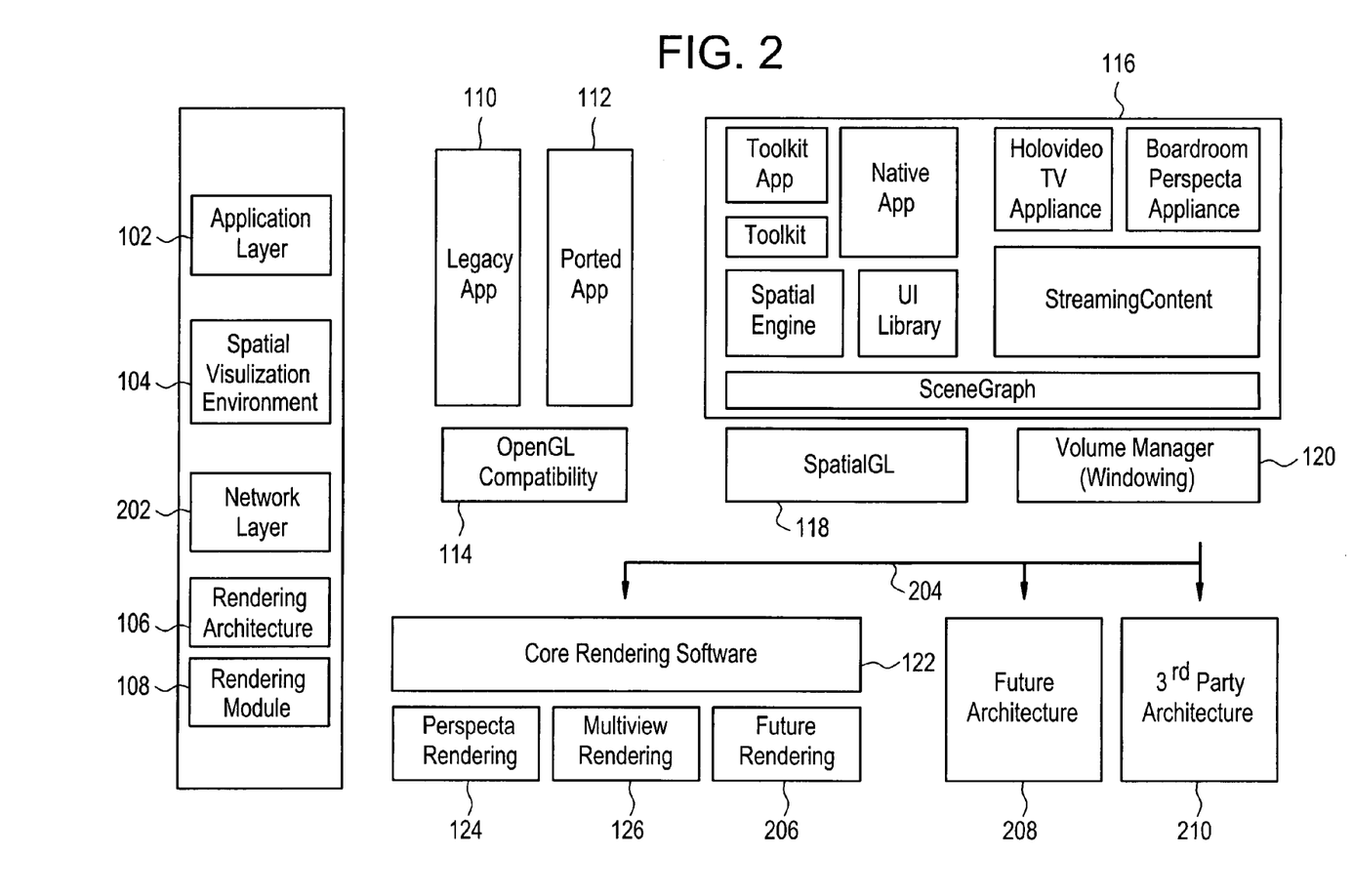
FIG. 2 depicts an more detailed view of an architecture that may be implemented by exemplary embodiments of the present invention.

FIG. 2 depicts a more detailed view of an architecture that may be implemented by exemplary embodiments of the present invention. The SVE layer 104 includes a collection of compatibility strategies between emerging displays and application software. One aspect of SVE provides compatibility with software applications to diverse display types through SpatialGL APIs and OpenGL APIs. The SVE concept extends in three additional directions: application software development can be accelerated by producing higher-level graphical programming toolkits; a spatial user interface (UI) library can provide applications with a consistent and intuitive UI that works well with 3-D displays; and a streaming content library allows the SVE to work with stored or transmitted content. This may be utilized to enable "appliance" applications and "dumb terminals."

In addition, the SVE is a display-agnostic and potentially remote-rendering architecture. The SVE can communicate with 2-D and very different 3-D displays (multiplanar, view-sequential, lenticular, stereoscopic, holographic). The rendering server does not need to be local to the display(s).

The CRS 122 is a collection of rendering strategies. The cost of implementing a rendering engine for a new display geometry breaks down into a system integration effort and an algorithm implementation effort. CRS 122 eliminates the system integration effort by providing a portable communication framework to bridge the client and server domains and by abstracting computation assets. The CRS 122 creates output for a Perspecta rendering module 124, a multiview rendering module 126 and can be tailored to create output for future rendering modules 206. In addition, the architecture depicted in FIG. 2 may be utilized to support future graphics display architectures and third-party architectures 210.

The spatial transport protocol (STP) describes the interaction between the Spatial Visualization Environment and Core Rendering Software. The spatial transport protocol comprises a set of commands. The STP may optionally comprise a physical definition of the bus used to communicate STP-formatted information. The STP commands are divided into several groups. One group of commands is for operating the rendering hardware, and frame buffer associated with the display. Another group of commands is for synchronizing the STP command stream with events on the host device, rendering hardware and frame buffer. Another group of commands is for operating features specific to the display hardware, such as changing to a low power mode or reading back diagnostic information.

Different streams of graphics commands from different applications may proceed through the architecture to be merged into a single STP stream. Due to multitasking, the STP is able to coherently communicate overlapping streams of graphics commands. STP supports synchronization objects between the applications (or any layer below the application) and the display hardware. The application level of the system typically generates sequential operations for the display drivers to process. Graphics commands may be communicated with a commutative language. For efficiency, the display hardware completes the commands out of order. Occasionally, order is important; one graphics operation may refer to the output of a previous graphics operation, or an application may read information back from the hardware, expecting to receive a result from a sequence of graphics operations.

Application Layer

Exemplary embodiments of the SVE include a 3-D rendering API and display virtualization layer that enables application developers to universally exploit the unique benefits (such as true volumetric rendering) of 3-D displays. It consists of several subsystems: SpatialGL 118, OpenGL compatibility module 114, streaming content library and volume manager 120. Future development may expand SVE to include scene-graph, rendering engine and application-specific plug-in subsystems.

SpatialGL

Just as OpenGL API implementations are video-card-specific, implementations of the SpatialGL API 118 are display, or output-device-specific. Examples of "targets" for SpatialGL implementations are: 2-D displays, volumetric displays, view-sequential displays, and lenticular multi-view displays. Exemplary embodiments of the SVE can communicate with a broad range of output devices whose underlying physics are quite different.

Figure 3:
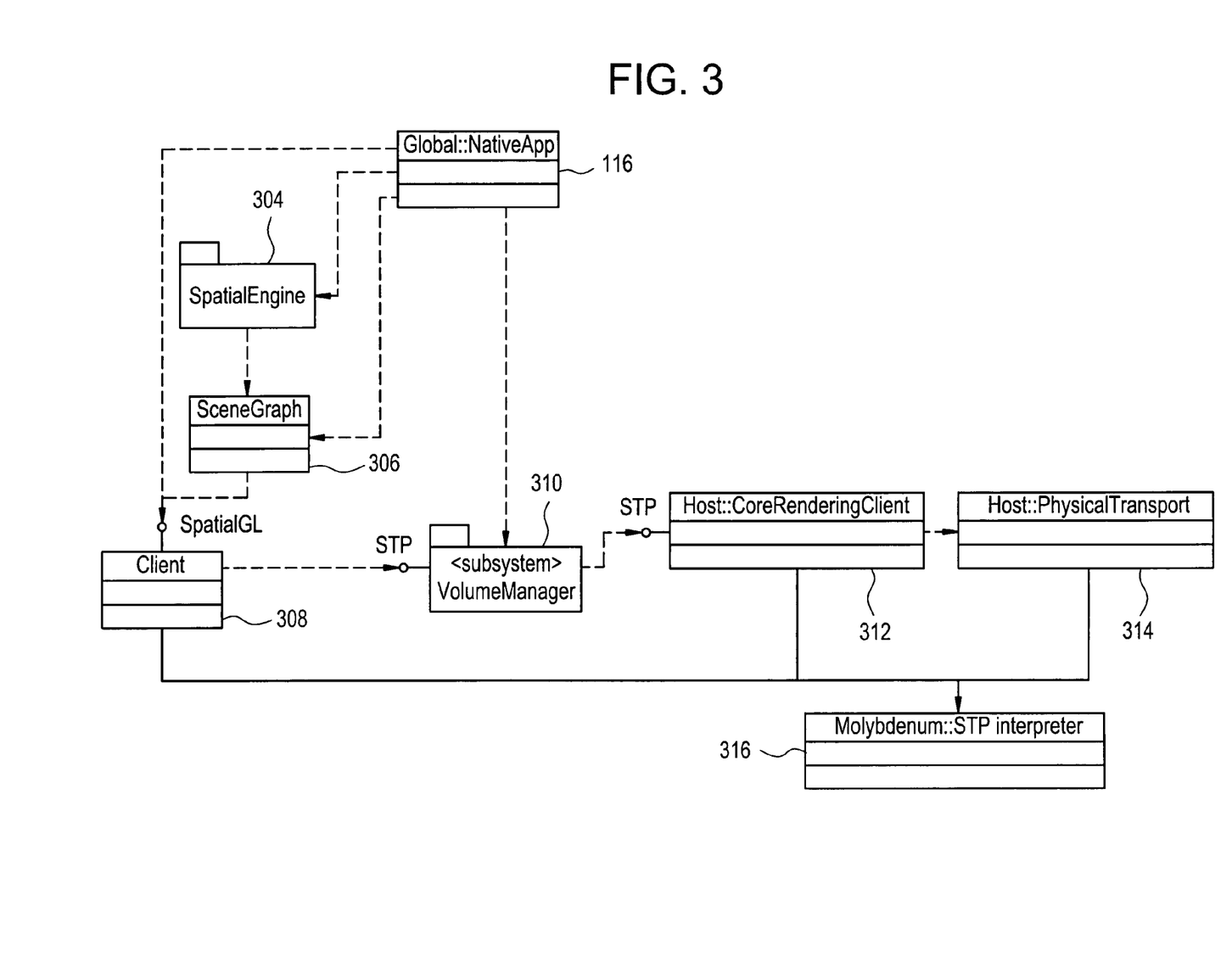
FIG. 3 is a block diagram of an exemplary spatial graphics language implementation.

FIG. 3 is a block diagram of an exemplary SpatialGL implementation that may be utilized by exemplary embodiments of the present invention. The blocks include a NativeApp block 116 which is written to take full advantage of spatial displays by using the SpatialGL API. The NativeApp block 116 may transmit data to the client 308, SpatialEngine 304, SceneGraph 306 and the volume manager 310. In alternate exemplary embodiments, applications can also take advantage of higher level APIs such as SceneGraph 306 and SpatialEngine 304 from Actuality Systems, Incorporated. SceneGraph 306 provides an interface for encoding scene graphs in SpatialGL. SceneGraph 306 implements features such as: assemble shapes into objects; transform the positions of an objects; and animation node. The SpatialEngine 304 implements high level functions such as draw volume and overlaying a scene-graph. SpatialEngine 304 is extensible. For example, an OilToolkit can be added, which adds functions such as: draw porosity volume, overlay drill path and animate path plan.

As depicted in FIG. 3, SpatialGL is input to the client 308. In exemplary embodiments of the present invention, the native API, or SpatialGL API, provides an object oriented front-end to the STP byte code. The SpatialGL API exposes features such as, but not limited to: define fragment program, define vertex program, bind geometry source, bind texture source, swap buffer and synchronize. The client 308 sends SpatialGL commands to the volume manager 310. The SpatialGL commands may include commands for retrieving persistent objects to be displayed on a graphical display device. The persistent objects include, but are not limited to, 2-D and 3-D textures and vertex buffers. The persistent objects may be stored on one or more of a database, a storage medium and a memory buffer. In addition, the SpatialGL commands may include commands for retrieving display nodes to be displayed on a graphical display device. Display nodes refer to an instance of any display that can be individually referenced (e.g., a Perspecta display, a 2-D display). STP commands from the volume manger 310 are sent to the core rendering client 312. The core rendering client 312 is the first computation resource available to the STP execution environment. Early data reducing filter stages can also execute here. Stream compression and volume overlay are processes that may be assigned computation resources at this point. The core rendering client 312 formats the remainder of the filter graph to take into account the physical transport 314 layer between the core rendering client 312 and the core rendering server. At the STP interpreter block 316, API calls are converted into STP. Each STP node is a computation resource. STP procedures get bound to STP nodes as the program is processed. The node executes any procedure that has been bound to it by a previous node.

Spatial Transport Protocol may be converted for persistent storage and written to a disk. This can be accomplished by storing the serialized Spatial Transport Protocol byte code to disk, along with a global context table. The global context table allows context-specific assets to be resolved when the STP file is later read back from disk. The global context table establishes correspondences between local context handles referenced by the STP byte code and persistent forms of the referenced data. For example, a STP byte code may reference texture image number 5. The texture image number is associated with specific data in the original local context of the byte code. When saved to disk, texture image number 5 is associated with a particular texture image by the local context table. This can be accomplished by storing in table position 5, a copy of the texture image, or by storing a GUID or URL that identifies a persistent source for the texture image.

Compatibility Module Structure

Figure 4:
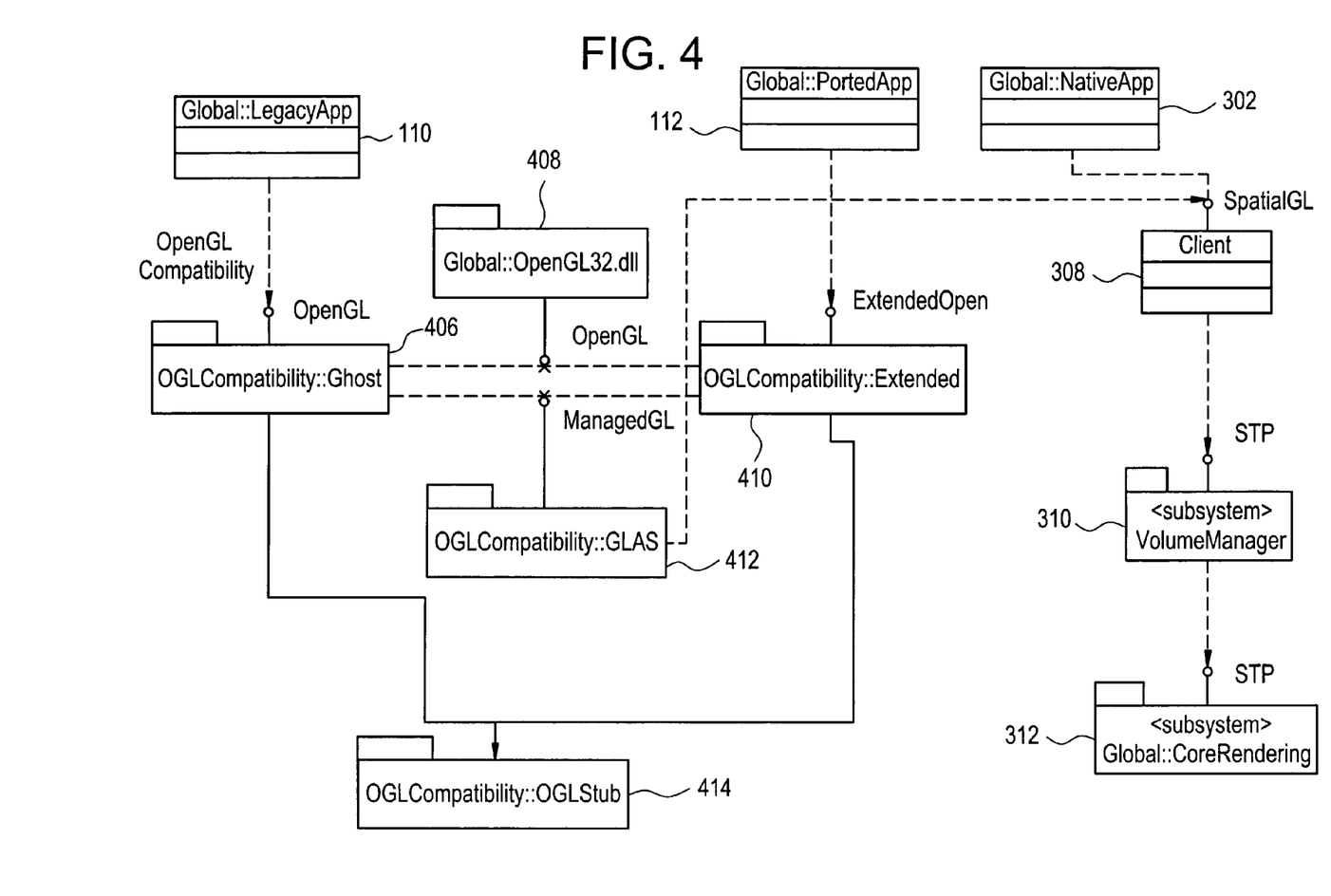
FIG. 4 is a block diagram of an exemplary compatibility module structure.

FIG. 4 is a block diagram of an exemplary compatibility module structure. Ported applications 112 and/or legacy applications 110 can provide input to the compatibility module structure depicted in FIG. 4. Ported applications 112 are applications originally written using OpenGL, but have been extended by programmers to interface with spatial displays. Legacy applications 110 are applications written with no knowledge of spatial displays or vendor APIs (e.g., Actuality Systems, Incorporated APIs). OpenGL support is provided through two dynamic link libraries. The main library is called the GLAS library 412. It provides drawing methods similar to the industry-standard OpenGL API, and also contains specialized initialization and state management routines for spatial displays. The GLAS library 412 converts OpenGL API calls into SpatialGL 118 calls. SpatialGL 118 is a low level graphics language utilized by exemplary embodiments of the present invention. The OGLStub library 414 exports an interface similar to the OpenGL32.dll system library 408. The behavior of the library can be customized on a per-application basis. The OGLStub library 414 intercepts and redirects OpenGL API calls in a customizable manner. Calls are optionally forwarded to the OpenGL32.dll system library 408 and/or the GLAS library 412 for translation.

OpenGL is an industry standard low-level 3-D graphics API for scientific and computer aided design (CAD) applications. OpenGL supplies a language that expresses static information. The application must explicitly break down dynamic scenes into discrete frames and render each one. OpenGL expresses commands such as: input a vertex; draw a triangle; apply a texture; engage a lighting model; and show the new rendering.

Referring to FIG. 3, OpenGL calls are duplicated for both the system library 408 (to render on the 2-D monitor) and for the GLAS library 412. By default, the first scene is analyzed to determine the depth center of the application's implied coordinate system. Since the depth center is not known until the first swap-buffers call, it may take until the second scene for the image in Perspecta to render properly.

The first scene is analyzed to determine the depth center of the application's coordinate system. Once the depth center is calculated, a fix-up transform is calculated. This transform is applied consistently to the projection specified by the application, so that the application's further transformations the projection (such as scaling and zooming) are reflected properly in the spatial rendering. After the depth center is determined, the Stub library 414 issues a redraw call to the application to ensure that the first scene is drawn properly in Perspecta.

The two main configurations are "ghost mode" 406 and "extended mode" 410. Ghost mode 406 automatically duplicates OpenGL calls for both the system library 408 and for the GLAS library 412. In ghost mode 406, depth centering is based on x and y scale and centered to get the majority of the vertices within the display. Ghost mode 406 provides an unextended OpenGL interface and attempts to make a spatial display appear as a 2-D display to the application. Extended mode 410 allows the application to control the call forwarding behavior. Extended mode 410 exposes an extended OpenGL interface. A few commands are added to help the application control a spatial display separately from a 2-D display. Example commands include: create a context for a spatial display and draw to a spatial display context. Output from the GLAS library 412, in SpatialGL, is sent to the client 308 and then to the volume manager 310. The volume manager 310 assigns display resources. It filters the STP stream to reformat the data according to the display resource assigned to the given context. The core rendering block 312, which contains the mechanisms for decoding and executing procedures in the STP language, receives STP commands.

The configuration is controllable for each application, based on a central control repository. Parameters that may configured include, but are not limited to: context selection strategy (allows the controller to change the context selection while the application is running); projection fix-up strategy that overrides the projection that that application specifies, in order to fit the image in the actual display geometry; texture processing strategy; context STP preamble (e.g., resolution hints); and scene STP preamble.

Some spatial displays physically realize view-dependent lighting effects. In this case, lighting is calculated based on the actual view directions, rather than the master direction given by the projection matrix.

Specific rasterization constraints and rules can only be specified relative to the unique geometry of each display type. In general, only fragments that intersect the projection of an element into the display's native coordinate system may be lit. When rendering polygons, elements must not contain holes. When rendering connected polygons where exact vertex positions are shared, the rendered figure must not contain holes.

When anti-aliasing is used, the partial ordering of the color value of the fragments must agree with the partial ordering of the intersection (area or length) between the fragment and pixels of the display's native coordinate system, when normalized for variation in area or volume of the pixels.

Streaming Content Library

The streaming content library permits spatial stream assets. A spatial stream asset is a time-varying source of spatial imagery. Optionally, the spatial stream may be synchronized with one or more audio streams. A spatial stream may either consist of a real-time stream, a recorded stream, or a dynamically generated stream. An example of a ream-time spatial stream is a multi-view stream that is fed from an array of cameras. An example of a recorded stream is a spatial movie stored on a removable disk. An example of a dynamically generated stream is a sequence of dynamically rendered 3-D reconstructions from a PACS database.

Each stream is associated with a spatial codec. The intended interpretation of the stream is determined by the associated spatial codec. The spatial codec is comprised of a stream encoding specification and a reconstruction specification. The stream encoding specification determines the mapping from the raw binary stream to a time-varying series of pixel arrays. The stream encoding specification may also identify an audio stream, synchronized with the pixel arrays. The reconstruction specification determines the intended mapping from pixel arrays to physical light fields. Examples of stream encoding specifications include MPEG coded representations. The reconstruction specification can be defined using the persistent form of Spatial Transport Protocol.

A client of the streaming content library receives the raw binary stream and the spatial codec. The client proceeds to reconstruct an approximation of the intended physical light field, by calculating pixel arrays using the stream encoding specification. At each time step, the client consumes one or more pixel arrays and interprets an intended light field, using the reconstruction specification. The intended light field is rendered into the local display's specific geometry, using Core Rendering Software. Finally, Core Rendering Software moves the rendered image into the spatial frame buffer, causing the display to generate a physical manifestation of a light field.

The streaming content library includes spatial stream asset servers. Each spatial stream asset is published by a spatial asset server. An asset server may publish one or more streams, each with a unique URL. A software application using SpatialGL (such as a spatial media player) can call up a particular spatial stream asset using its associated URL.

Spatial stream assets may be transmitted with unidirectional signaling: for example several TV channels may be jointly used to transmit a multi-view recording. In this case, the spatial codec can be continuously or periodically transmitted. Spatial content may also be broadcast with bidirectional signaling: for example, a spatial movie may be downloaded from an Internet-based asset server and viewed using a spatial media player using SpatialGL. In this case, the client could potentially negotiate an optimal spatial codec to match the client's display geometry. Bidirectional signaling can also be used to allow a client to remotely control a dynamically generated stream. For example, a client may continuously send updates to a server about the desired view direction and region of interest, while the server continuously returns rendered images to the client through the streaming library. Alternately, a client may receive notifications from the spatial stream asset server when new data is available. Based on the notifications, the client may choose to download and render the new data or else the client may skip the new data. When receiving an notification, the client may decide whether to download or skip the new data, based on factors such as the currently available buffer space, communication bandwidth, processing power, or desired level of image quality.

Pseudo-Code Reconstruction Specification for a Multi-View Stream

Define n views $V_1, \ldots, V_n$, each comprised of a projection $P_i$ and an aperture $Q_i$
For each time step t
   For each view $V_i$,
     Render a plane, textured with pixel array t*n+i, using projection $P_i$
     Render aperture $Q_i$
   Swap the rendered image into the active frame buffer Pseudo-Code Reconstruction Specification for a Volumetric Stream Define a local 3-D texture asset T
For each time step t
   For each pixel array i in 1 . . . n
     Load pixel array i into slice i of texture T
   Render a solid cube, textured with T
   Swap the rendered image into the active frame buffer

Network Layer

In an exemplary embodiment of the present invention, the CRS 122 has the character of a slave peripheral and communication to the CRS 122 is limited to proprietary channels. Alternate exemplary embodiments of the CRS 122 have an expanded role as a network device. In addition, it can communicate with a host over a network, and it supports standard protocols for network configuration. The CRS 122 has both a client part and a server part.

In exemplary embodiments of the present invention, a host PC runs an application and is in communication with a single multiplanar 3-D display which contains an embedded core rendering electronics system. The client part is embodied on the host PC, while the server part is embodied on the core rendering electronics. CRS 122 is distinct from the SVE because the CRS 122 is meant primarily to provide a rendering engine for specific display types that is compatible with the display-independent graphical commands generated in the SVE.

The client side of the CRS 122 interfaces to the SVE using the STP language. STP is used to package and transport SpatialGL API calls. A core rendering client connects the volume manager 120 to the physical transport by acting as an STP interpreter. The core rendering client interpreter exposes procedures (with STP linkage) that allow an STP program to address specific servers. Exemplary embodiments of the present invention only function when a single server is present. Alternate exemplary embodiments of the core rendering client communicate with servers over a network, and are able to list and address the set of available servers.

The client also provides a boot service. This provides the boot-image used by the net-boot feature of the servers. The boot-image is stored in a file that can be updated by Perspecta Software Suite upgrade disks (or via web upgrade). The boot service can be enabled and disabled by the SVE. After the boot-image file is upgraded, the installer must enable the boot service to allow the display to update.

In the current example, in which there is one host PC and one Perspecta display, all input to the system arrives through the gigabit Ethernet connections. The embedded system acts as a normal Internet Protocol (IP) device. The embedded system acts as a server, while the host PC acts as a client. The server acts as a normal IP device. In exemplary embodiments of the present invention, the client and server must be directly connected. In alternate exemplary embodiments of the present invention, clients and servers are connected through a gigabit switch. This configuration removes the requirement that the client PC contains two Ethernet controllers, and it allows multiple clients to connect to a single server. The server obtains an IP address using dynamic host configuration protocol (DHCP) (unless it has been configured to use a static address). Once an IP address has been obtained, the CRS 122 and the client must be made aware of the identity of the server. This is done by a symmetric system where a node (client or server) broadcasts a datagram when it starts. The node that starts first obtains the identity of the later node. If the server is started first, and encounters a client datagram broadcast, it opens a connection to the client to communicate the server's identity. A client may simultaneously communicate with multiple servers. Each server may only communicate with a single client at a time.

In alternate exemplary embodiments of the present invention, the servers have a user interface and policy for attaching to specific clients when more than one client is available. The CRS 122 provides a simple network management protocol (SNMP) interface to manage the network settings of the server. The SNMP interface configures the IP address, broadcast settings and security settings. The security settings include client allow and deny lists.

In exemplary embodiments of the present invention the host and client support a single gigabit Ethernet connection. In alternate exemplary embodiments, the host and client employ an additional protocol to support two gigabit Ethernet connections.

Once a client knows the identity of a server, the client may open the server. The client and server communicate through datagrams. The server is single-threaded; the client may only open a single connection to the server and it is guaranteed exclusive access to the entire display resource. Once the client has opened the server, it may begin transacting rendering commands. Rendering commands are moved between the client and server using a command stream and a remote memory protocol.

Since the network graphics service is meant to communicate only over a local network segment, a very low level of packet loss is expected. The details of the communication scheme can be arranged to ensure that the system degrades gracefully under packet loss. Device allocation and context creation must be guaranteed to operate correctly under packet loss. The bulk graphics data transfer is not protected, except that a frame that is rendered without packet loss must not be degraded by packet loss in previous frames. Persistent texture map data is protected against packet loss by a checksum and a failure/retry scheme.

Core Rendering Software (CRS)

CRS 122 uses the STP language as a form for communicating graphics commands and procedures. STP allows the interfaces between the major components of the Core Rendering Software system to be uniform. In the initial version of Core Rendering Software, STP serves as the inter-process-communication mechanism. STP is used to communicate a sequence of graphics commands from the client to the server. The initial version of STP will include conditional execution and parallel branching prototype features. In later versions of Core Rendering Software, modules will be written within the STP language, thus flattening the hardware-native part of the architecture. Conditional execution and parallel branching features will be optimized in later versions of Core Rendering Software.

Rendering Modules

Figure 5:
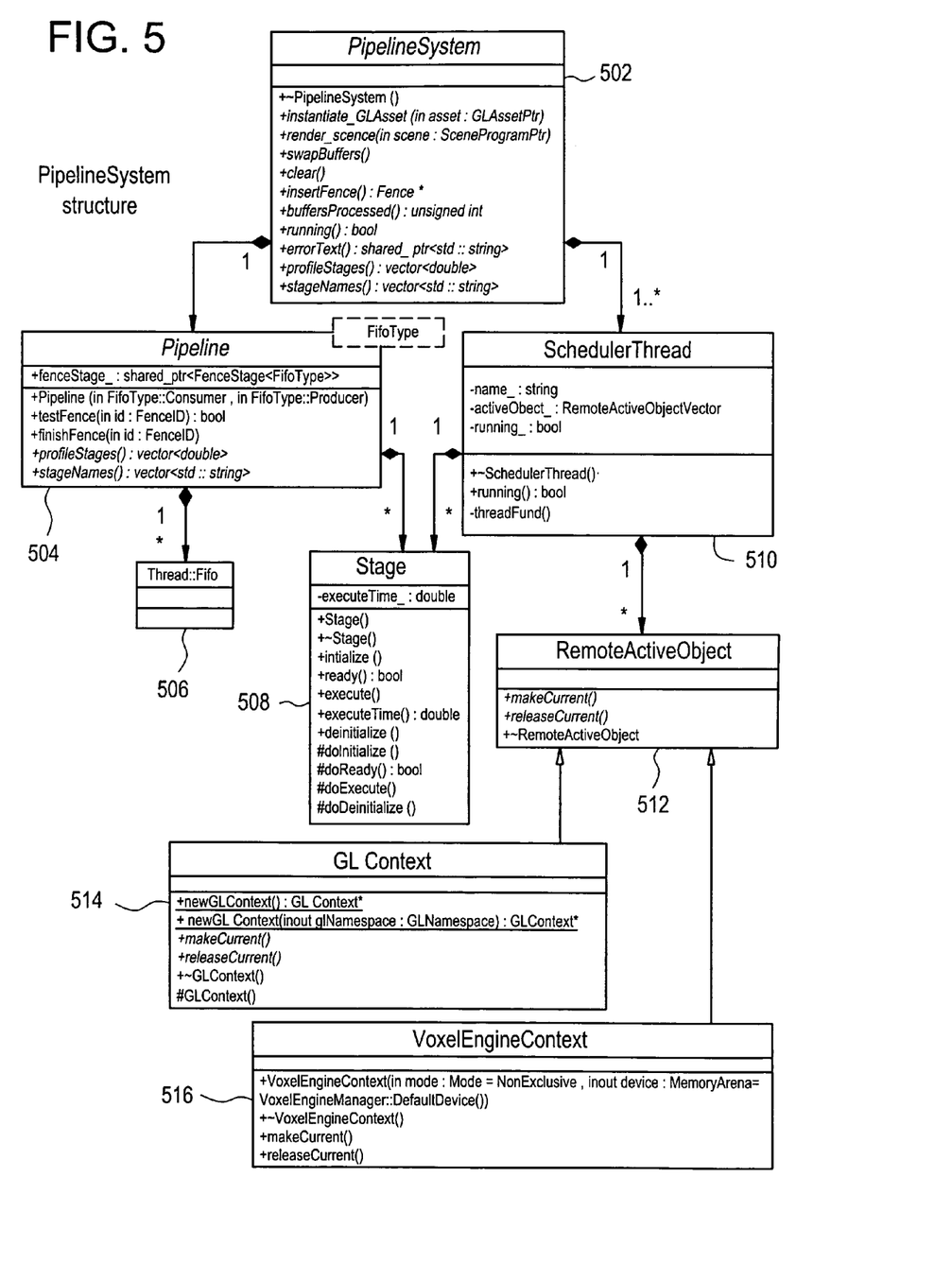
FIG. 5 is a block diagram of an exemplary rendering module.

FIG. 5 is a block diagram of an exemplary rendering module. The pipeline system structure, or pipeline framework, subsystem provides the generic structure that is common to rendering pipelines for the CRS 122. A rendering pipeline is implemented through a pipeline system class 502. A pipeline system class 502 is composed of a rendering pipeline and a fixed set of active objects. An active object models a device that can trade time for data movement or transformation, such as a bus, a GPU or a CPU. The pipeline system class 502 binds stages to scheduler threads 510 (i.e., to active objects). The scheduler thread 510 is the binding between stages and active objects.

An instance of a pipeline 504 operates on a single input stream of homogeneous elements. An exemplary pipeline constructor includes: initiate first-in-first-out (FIFO) length; and initialize stage connections. As depicted in FIG. 5, fixed length FIFOs 506 constrain the resource usage of the system.

Rendering pipelines are implemented as a series of stages 508 that communicate with tasks. A stage 508 is an algorithmic unit that transforms one stream of tasks into another stream of tasks. Although a stage 508 may be designed to be compatible with a specific active object 512, the binding to the active object 512 is external to the stage 508. For example, a stage 508 may implicitly require a binding with a GPU by making OpenGL calls, but it must not own or manipulate an OpenGL context.

Stage objects have an unusually complicated life cycle. They are typically created in one thread but work in a second thread. The lifetime of a stage 508 consists of these distinct transitions: construction, initialization, execution, de-initialization, and destruction. A stage 508 transforms a stream of homogeneous elements. A stage 508 utilizes the resources of a single active object and executes several hundreds of times a second. The biding between a stage 508 and an active object 512 is external to the stage class. Therefore, a pipeline 504 may be considered a stage 508, but a pipeline system 502 may not be considered a stage 508. The remote active object 512 depicted in FIG. 5 models a thread of execution that exists outside of the CPU. Input to the active object 512 includes data from the GL context block 514 and the voxel engine context block 516.

Task objects are not strongly structured, outside of their specific implementation domain. In exemplary embodiments of the present invention, the pipeline framework includes a Fence class, which is utilized to provide a main stream synchronization pattern. A pipeline system 502 operates asynchronously from its enclosing system. The enclosing system can insert a Fence into the command stream of a pipeline 504. A pipeline passes a fence when all processing due to tasks issued before the fence have completed. The enclosing system can query whether the pipeline 504 has passed the fence, or it can block until the fence has been passed.

SpatialGL Graphics Pipeline for Other Displays

As described above, a key feature of the SVE is display-independence (or "display-agnosticism"). Implementations of the SpatialGL API can be made for a variety of 2-D and 3-D displays. The SpatialGL API may be utilized with a Perspecta multiplanar volumetric display. In addition, the SpatialGL API may be utilized with other types of displays.

Because multi-view rendering is very similar to single-view rendering, the SpatialGL implementation is substantially simpler than the SpatialGL implementation for multiplanar rendering. For example, on flat, horizontal-parallax multi-view displays, such as the Stereographics 9-view lenticular display or Actualty System's quasi-holographic video display, a slice volume could be created as part of the rendering process. A slice volume contains a slice for each rendered view direction. Rendered views use sheared versions of standard projection matrices, corresponding to the viewing angles. "Final views" correspond to the views that are physically generated by the display hardware. Final views are sampled from the slice volume (for example, using texture mapping). The number of final views may be different than the number of rendered views.

Rendering tetrahedra requires special treatment because, at the time of writing, GPUs lack native volumetric rendering support. In this case, SpatialGL wraps an efficient volume rendering implementation such as ray casting.

Depending on the multiview display, image formatting can be different. Because Stereographics' lenticular display interfaces via digital visual interface (DVI), it does not require special formatting hardware (such as the Voxel Engine in Actuality Systems, Incorporated's Core Rendering Electronics). However, the distribution of pixels and views is somewhat irregular, and requires a reformatting process known as "interzigging." Additionally, view anti-aliasing can occur during this step. On the other hand, Actuality Systems' holovideo display was designed to use the same Core Rendering Electronics as Perspecta, and can share the same implementation.

Because SpatialGL is display-agnostic, SpatialGL can also be used for non-3D displays. Examples include tiled display walls, displays with heterogeneous interfaces (e.g. the Sunnybrook HDR LCD, foveated resolution displays), and displays with unusual geometries (e.g. dome, sphere or cube shaped displays). Finally, an obvious example would be a standard 2-D display such as a desktop cathode ray tube (CRT) or liquid crystal display (LCD). This would allow the use of SpatialGL programs on standard computer hardware without an exotic display configuration. For the most part, the rendering of these displays only requires changes in the image reformatting stage, and minor changes elsewhere.

Figure 6:
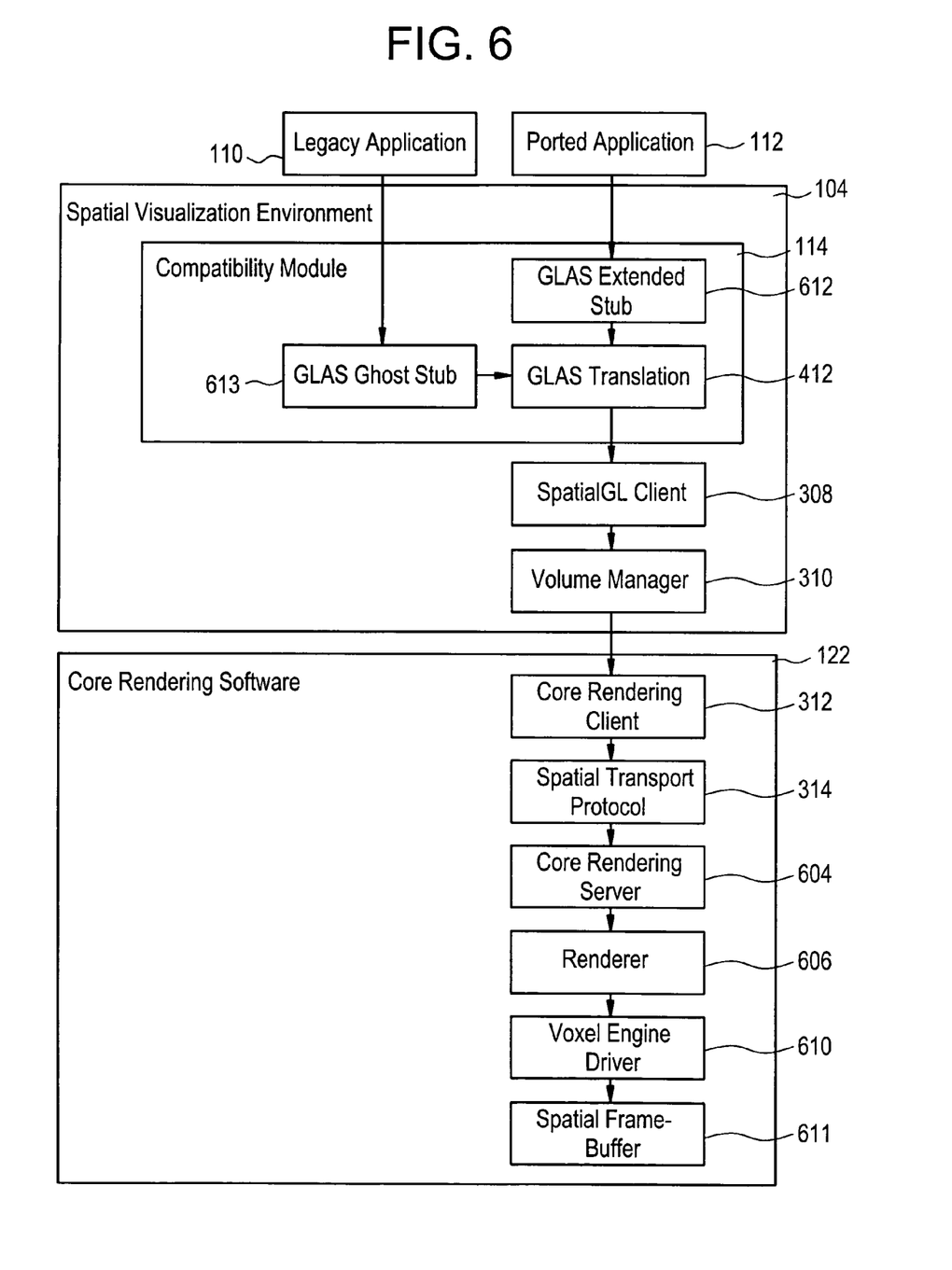
FIG. 6 is an exemplary process flow diagram for processing a command from a ported application.

FIG. 6 is an exemplary process flow diagram of a command from a ported application. A ported application 112 renders a scene by issuing function calls via the compatibility module 114 to the GLAS Extended API (similar to OpenGL). These API calls specify features of the scene, such as texture images, the position and shape of primitive elements (such as lines points and triangles) and the mappings between elements textures and colors. The GLAS extended stub library 612 receives the API calls and issues them to the GLAS translation library 412. The GLAS translation library manages the OpenGL state machine to interpret the GLAS Extended API calls. Interpreted calls are translated into SpatialGL API calls.

Legacy applications invoke a similar command flow. In this case, a legacy application 110 renders a scene by issuing function calls via the compatibility module 114 to the GLAS Ghost API (similar to OpenGL). The GLAS ghost stub library 613 receives the API calls and reformats the scene in preparation for translation to SpatialGL. For example, the stub library may apply a heuristic that inspects the Ghost API calls to estimate the intended depth center of the scene. This additional information is passed to the GLAS translation library 412, along with the API calls generated by the legacy application. Interpreted calls are translated into SpatialGL API calls.

The SpatialGL client library 308 directs the API calls to the volume manager 310, along with association information to identify the software application instance that generated the commands (the ported application).

The volume manager 310 modifies the API call stream. For example, it may map the application's rendering output to a specific potion of the graphics volume generated by the display device. It may also apply an overlay to the rendering output, such as a sprite that marks the location of a 3-D pointer.

After the volume manager 310, the core rendering client library 312 marshals the API calls and transmits them (for example, using Spatial Transport Protocol 314) to the server execution environment. The core rendering software (instantiated in the server execution environment) receives and umnarshals API calls.

The core rendering server 604 operates rendering algorithms, based on the API calls. The rendering algorithms are defined by a renderer module 606. In general, there is a specialized renderer module for each distinct class of display geometry. The rendering algorithms cause rendered image bitmaps to be moved into the spatial frame-buffer 611, using the voxel engine driver 610.

Exemplary embodiments of the present invention allow applications to have access to a wider variety of assets, rendering algorithms and displays. Conversion to new display technologies may be facilitated by providing interfaces to legacy and ported applications.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer implemented method for transforming graphical information, the method comprising:
   receiving, at a processor, one or more graphics commands using an application programming interface (API);
   converting, at the processor, the graphics commands into a graphical language that facilitates the execution of the commands for a plurality of output device types including a two-dimensional (2-D) output device type and a plurality of three-dimensional (3-D) output device types;
   generating display-agnostic output in response to the converted graphics commands in the graphical language; and generating display type specific output for display on an output device, the generating display type specific output in response to the display-agnostic output and to an output device type of the output device.

2. The method of claim 1 further comprising determining a type of the API from a plurality of API types, wherein the converting is responsive to the API type.

3. The method of claim 2 wherein the API type is OpenGL.

4. The method of claim 2 wherein the API type is the graphical language.

5. The method of claim 1 wherein the generating display type specific output includes converting the display-agnostic output into a data stream and transmitting the data stream for display on an output device having the output device type.

6. The method of claim 5 wherein the output device is a display device.

7. The method of claim 6 wherein the display device is a two-dimensional (2-D) display device.

8. The method of claim 6 wherein the display device is a three-dimensional (3-D) display device.

9. The method of claim 6 wherein the display device is a multi-view display device.

10. The method of claim 5 wherein the output device is one or more of a 2-D printer and a 3-D printer.

11. The method of claim 1 wherein the graphics commands are written by a legacy application.

12. The method of claim 1 wherein the graphics commands are written by a ported application.

13. The method of claim 1 wherein the graphics commands are written by a native application.

14. The method of claim 1 further comprising recording the converted graphics commands in the graphical language on a storage medium.

15. The method of claim 1 wherein the graphics commands are generated using a time-varying data source associated with information defining an intended interpretation of the time-varying data source.

16. The method of claim 15 wherein the definition of the time-varying data source is comprised of a specification of a mapping file from the time-varying data source to pixel arrays and a specification of an intended mapping from the pixel arrays into physical light fields.

17. The method of claim 15 wherein one or more audio streams are synchronized with the graphics commands.

18. The method of claim 15 wherein the time-varying data source is responsive to a software application that is also receiving time-varying data.

19. The method of claim 18 wherein the software application receives notifications when new data is available from the time-varying data source and optionally schedules the execution of graphics commands based on the notifications.

20. The method of claim 1 wherein the graphics commands include one or more of a list of named display nodes and a command relative to a specific display node.

21. A computer implemented architecture for transforming graphical information, the architecture comprising:
an application software layer for receiving one or more graphics commands using an API;
a spatial visualization environment layer for converting, at a processor, the graphics commands into a graphical language that facilitates the execution of the commands for a plurality of output device types including a 2-D output device type and a plurality of 3-D output device types;
a rendering architecture layer for generating display-agnostic output in response to the converted graphics commands in the graphical language; and
a device specific rendering module layer for generating display type specific output in response to the display-agnostic output and an output device type.

22. The architecture of claim 21 wherein the spatial visualization environment layer further records the converted graphics commands in the graphical language on a storage medium.

23. The architecture of claim 21 wherein the generating display type specific output includes converting the display-agnostic output into a data stream and transmitting the data stream for display on an output device having the output device type.

24. The architecture of claim 23 further comprising a display layer for receiving the data stream and displaying the data stream on the output device.

25. The architecture of claim 23 wherein the output device includes one or more of a 2-D display, a 3-D display and a multi-view display.

26. The architecture of claim 23 wherein the output device includes one or more of a 2-D printer and a 3-D printer.

27. A system for transforming graphical information, the system comprising:
an input device for receiving graphics commands using an API; and
a processor in communication with the input device including instructions for converting the graphics commands into a graphical language that facilitates the execution of the commands for a plurality of output device types including a 2-D output device type and a plurality of 3-D output device types, for generating display-agnostic output in response to the converted graphics commands in the graphical language, and for generating display type specific output for display on an output device, the generating display type specific output in response to the display-agnostic output and to an output device type.

28. The system of claim 27 wherein the processor further facilitates determining a type of the API from a plurality of API types supported by the instructions, wherein the converting is responsive to the API type.

29. The system of claim 28 wherein the API type is OpenGL.

30. The system of claim 28 wherein the API type is the graphical language.

31. The system of claim 27 wherein the processor includes further instructions for transmitting the converted graphics commands in the graphical language to a rendering module for display on an output device.

32. The system of claim 31 wherein the output device is remote from the processor and the transmitting is via a network.

33. The system of claim 27 wherein the graphics commands include commands that actively cause images to be displayed on the output device.

34. The system of claim 27 wherein the graphics commands include commands for retrieving persistent objects.

35. The system of claim 27 wherein the graphics commands include one or more of a list of named display nodes and a command relative to a specific display node.

36. A computer program product for transforming graphical information, the computer program product comprising:
a physical storage recordable medium readable by a processing circuit and storing instructions for execution by the processing circuit for performing a method comprising:
receiving one or more graphics commands written in an API;

converting the graphics commands into a graphical language that facilitates the execution of the commands for a plurality of output device types including a 2-D output device type and a plurality of 3-D output device types;

generating display-agnostic output in response to the converted graphics commands in the graphical language; and generating display type specific output for display on an output device, the generating display type specific output in response to the display-agnostic output and to an output device type of the output device.

37. The method of claim 1 wherein one of the plurality of 3-D output device types is stereoscopic.

38. The method of claim 1 wherein one of the plurality of 3-D output device types is spatially multiplexed.

39. The method of claim 1 wherein one of the plurality of 3-D output device types is temporally multiplexed.

40. The method of claim 1 wherein one of the plurality of 3-D output device types is electro-holographic.

41. The method of claim 1 wherein the plurality of 3-D output device types includes at least two of stereoscopic, spatially multiplexed, temporally multiplexed, and electro-holographic.

42. A computer implemented method for transforming graphical information, the method comprising:

receiving, at a processor, one or more graphics commands using an application programming interface (API);

converting, at the processor, the graphics commands into a graphical language that facilitates the execution of the commands for a plurality of output device types including a two-dimensional (2-D) output device type and a plurality of three-dimensional (3-D) output device types, the plurality of 3-D output device types comprising at least two of stereoscopic, spatially multiplexed, temporally multiplexed, and electro-holographic;

generating display-agnostic output in response to the converted graphics commands in the graphical language; and generating display type specific output for display on an output device, the generating display type specific output in response to the display-agnostic output and to an output device type of the output device.

43. A computer implemented method for transforming graphical information, the method comprising:

receiving, at a processor, one or more graphics commands using an application programming interface (API);

converting, at the processor, the graphics commands into a display-agnostic graphical language that facilitates the execution of the commands for a plurality of output device types including a two-dimensional (2-D) output device type and a plurality of three-dimensional (3-D) output device types; and generating display type specific output for display on an output device, the generating in response to the converted graphics commands in the display-agnostic graphical language and to an output device type of the output device.

44. A computer implemented method for transforming graphical information, the method comprising:

receiving, at a processor, one or more graphics commands using an application programming interface (API);

converting, at the processor, the graphics commands into a display-agnostic graphical language that facilitates the execution of the commands for a plurality of output device types including a two-dimensional (2-D) output device type and a plurality of three-dimensional (3-D) output device types, the plurality of 3-D output device types comprising at least two of stereoscopic, spatially multiplexed, temporally multiplexed, and electro-holographic; and generating display type specific output for display on an output device, the generating in response to the converted graphics commands in the display-agnostic graphical language and to an output device type of the output device.

* * * * *